United States Patent
Park (10) Patent No.: US 12,086,499 B2
(45) Date of Patent: Sep. 10, 2024

(54) ARTICLE OF FURNITURE FEATURING COLLABORATIVE ROUNDTABLE AUDIO-VIDEO CONFERENCING

(71) Applicant: Vistage Innovation LLC, Monte Sereno, CA (US)

(72) Inventor: Christopher Park, Aptos, CA (US)

(73) Assignee: Vistage Innovation LLC, Monte Sereno, CA (US)

( * ) Notice: Subject to any disclaimer, the term of this patent is extended or adjusted under 35 U.S.C. 154(b) by 195 days.

(21) Appl. No.: 17/837,318

(22) Filed: Jun. 10, 2022

(65) Prior Publication Data

US 2023/0086632 A1     Mar. 23, 2023

Related U.S. Application Data

(60) Provisional application No. 63/246,467, filed on Sep. 21, 2021.

(51) Int. Cl.
  *G06F 3/14*    (2006.01)
  *G06F 3/16*    (2006.01)
  *H04L 65/403*  (2022.01)
  *H04N 23/69*   (2023.01)
  *H04N 23/698*  (2023.01)

(52) U.S. Cl.
  CPC .......... *G06F 3/1454* (2013.01); *G06F 3/1446* (2013.01); *G06F 3/16* (2013.01); *H04L 65/403* (2013.01); *H04N 23/69* (2023.01); *H04N 23/698* (2023.01)

(58) Field of Classification Search
  CPC ........ G06F 3/1454; G06F 3/1446; G06F 3/16; G06F 3/14; H04N 23/69; H04N 23/698; H04L 65/403
  See application file for complete search history.

(56) References Cited

U.S. PATENT DOCUMENTS

| | | | |
|---|---|---|---|
| 6,343,006 B1 * | 1/2002 | Moscovitch | B60R 11/0235 |
| | | | 361/679.04 |
| 7,962,364 B2 * | 6/2011 | Penke | G06Q 20/20 |
| | | | 705/16 |
| 9,531,996 B1 * | 12/2016 | Duys | H04N 7/15 |
| 9,674,453 B1 * | 6/2017 | Tangeland | H04N 23/661 |

(Continued)

OTHER PUBLICATIONS

POLYCOM brochure, Real Presence, 2021.
CISCO brochure, Telepresence, 2021.

*Primary Examiner* — Olisa Anwah
(74) *Attorney, Agent, or Firm* — Mark Protsik; Thomas Schneck (57) ABSTRACT

An article of furniture that facilitates roundtable collaborative audio-video conferencing comprises a pedestal with side walls that support two monitors at each of multiple viewer locations. One set of monitors provides a gallery view of other conference participants, while the other set of monitors is available for shared content. A top portion of the pedestal includes a 360° camera and directional microphones. The camera's field of view may be directed toward the current speaker or alternatively segmented into viewer locations and restitched to create the gallery view. In a second embodiment, the pedestal supports an upper tower to contain the camera, directional microphones, speakers, I/O signal distribution pod, and optionally one set of monitors.

12 Claims, 8 Drawing Sheets

(56) References Cited

U.S. PATENT DOCUMENTS

| | | | | |
|---|---|---|---|---|
| 2004/0001137 A1* | 1/2004 | Cutler | ............... | H04N 7/142 |
| | | | | 348/14.09 |
| 2004/0257431 A1* | 12/2004 | Girish | ............ | H04N 21/43632 |
| | | | | 348/E7.079 |
| 2010/0118112 A1* | 5/2010 | Nimri | ............... | H04N 7/142 |
| | | | | 348/E7.083 |
| 2022/0206530 A1* | 6/2022 | Hyun | ............... | G06F 3/0481 |

* cited by examiner

ARTICLE OF FURNITURE FEATURING COLLABORATIVE ROUNDTABLE AUDIO-VIDEO CONFERENCING

CROSS-REFERENCE TO RELATED APPLICATION

The present application claims priority under 35 U.S.C. 119(e) from U.S. Provisional Application 63/246,467, filed Sep. 21, 2021.

TECHNICAL FIELD

The present invention relates to office furniture in the form of tables, desks, stands, or cabinets specially adapted for holding or supporting electronic audio-video equipment with multiple viewing stations for use in roundtable conferencing.

BACKGROUND ART

Audio-video conferencing is becoming ever more popular as a way to conduct meetings and share content. Participants can collaborate, even if not physically present, via remote telecommunications links. However, even if participants are present together in the same room, sharing of electronic content in a convenient, easily viewable manner while seated around a conference table is still problematic. Any electronic displays are either placed on a wall to one side of a conference table, or if centrally located are possibly viewable only from some viewer locations, and in any case tend to block the view of the other participants. Remote participants, as for example via a Zoom meeting, generally cannot simultaneously see both a gallery view of fellow conference participants and shared electronic content on their display monitor.

In U.S. Pat. No. 7,962,364, Penke et al. describe a multimedia communications and collaboration hub for providing interactive public access to services through data transfer, sharing and collaboration, including videoconferencing capabilities, content viewing, copying, printing, and other services. The multimedia hub is in the form of a kiosk comprising two towers with a video display device and work surface extending between the towers. Cameras, microphones, and speakers are mounted on the hub, such as on the video display. This provides certain public access to conferencing-like services but is not a complete solution to collaborative conferencing with multiple participants.

SUMMARY DISCLOSURE

An article of furniture for collaborative audio-video conferencing is provided. In a preferred embodiment, a pedestal has a plurality of side walls that correspond to respective viewer locations. The pedestal also has a horizontal upper surface that is typically (but necessarily) planar. In this arrangement, a set of video monitors are supported by the side walls of the pedestal, such that at least two monitors (e.g., upper and lower monitors) correspond to and are viewable at each of the multiple viewer locations. One of the monitors at each viewer location is available to display a gallery view of other conference participants (including at least those at the other viewer locations around the pedestal, but also possibly other participants at remote locations). Another of the monitors at each viewer location is available to display shared content. In this way, both shared content and the gallery view of other participants can be seen simultaneously by participants situated around the pedestal. (An ability for simultaneous shared content and gallery views for any remote participants will naturally depend on the specific technical facilities provided at those remote locations.) In the case where the pedestal, possibly wheeled for ease of movement, sits directly upon the floor with the participants seated around that pedestal, such that the video monitors are at least partially situated below eye level, those monitors can be supported on hinged side walls that provide an upward-directed display angle of approximately 15°, so their screens are then more easily visible to the participants. An instrument pod is provided on top of the horizontal upper surface of the pedestal. The instrument pod will include at least a grill with an embedded array of microphones, an omnidirectional (360°) camera, and possibly a wireless data communication unit. Speakers can be provided in the instrument pod or, more usually, with the video monitors.

In another embodiment, a vertical central tower supports a set of video monitors arranged around that central tower such that at least two monitors are viewable at each of a plurality of viewer locations. Such a vertical central tower may project upward from a table or from the floor. A lower portion of the tower may be in the form of a box or pedestal with side walls supporting monitors on each side. The monitors viewable at each viewer location could comprise stacked lower and upper monitors, wherein the upper monitors might be inset closer to the tower center than the lower monitors. Or each viewer location may have parallel side-by-side monitors. At least one of the monitors at each viewer location is dedicated to displaying shared content, while another monitor at each viewer location displays images of the other conference participants seated at the other viewer locations (and/or any remote participants). Additionally, an upper portion of the tower extending above the pedestal may include a central stack comprising a camera pod, an audio pod and an I/O signal distribution pod all mounted to the top of the tower. The camera pod has an omnidirectional (360°) camera.

In one possible implementation, a field of view of the 360° camera can be segmentable into multiple visual data streams, each visual data stream coinciding with one of the viewer locations, and a monitor at each viewer location is connected to receive a stitched visual data stream composed from the multiple visual data streams for each of the other viewer locations, the monitor thereby displaying conference participants at all other viewer locations in side-by-side relation. For example, where the number of viewer locations around the pedestal or tower is four, the field of view of the 360° camera is segmented into four, up to 90°-wide, visual data streams and a monitor at any given viewer location shows participants at the other three viewer locations in a stitched (up to 270°-wide) side-by-side manner. Matrix-like gallery views of participants are also possible, especially where there are additional remote participants.

The audio pod has directional microphones, such as a microphone array, and (if not provided with the display monitors) speakers for each viewer location. An (optional) I/O signal distribution pod can provide wireless data communication, especially for sharing of data content.

DETAILED DESCRIPTION

Figure 1:
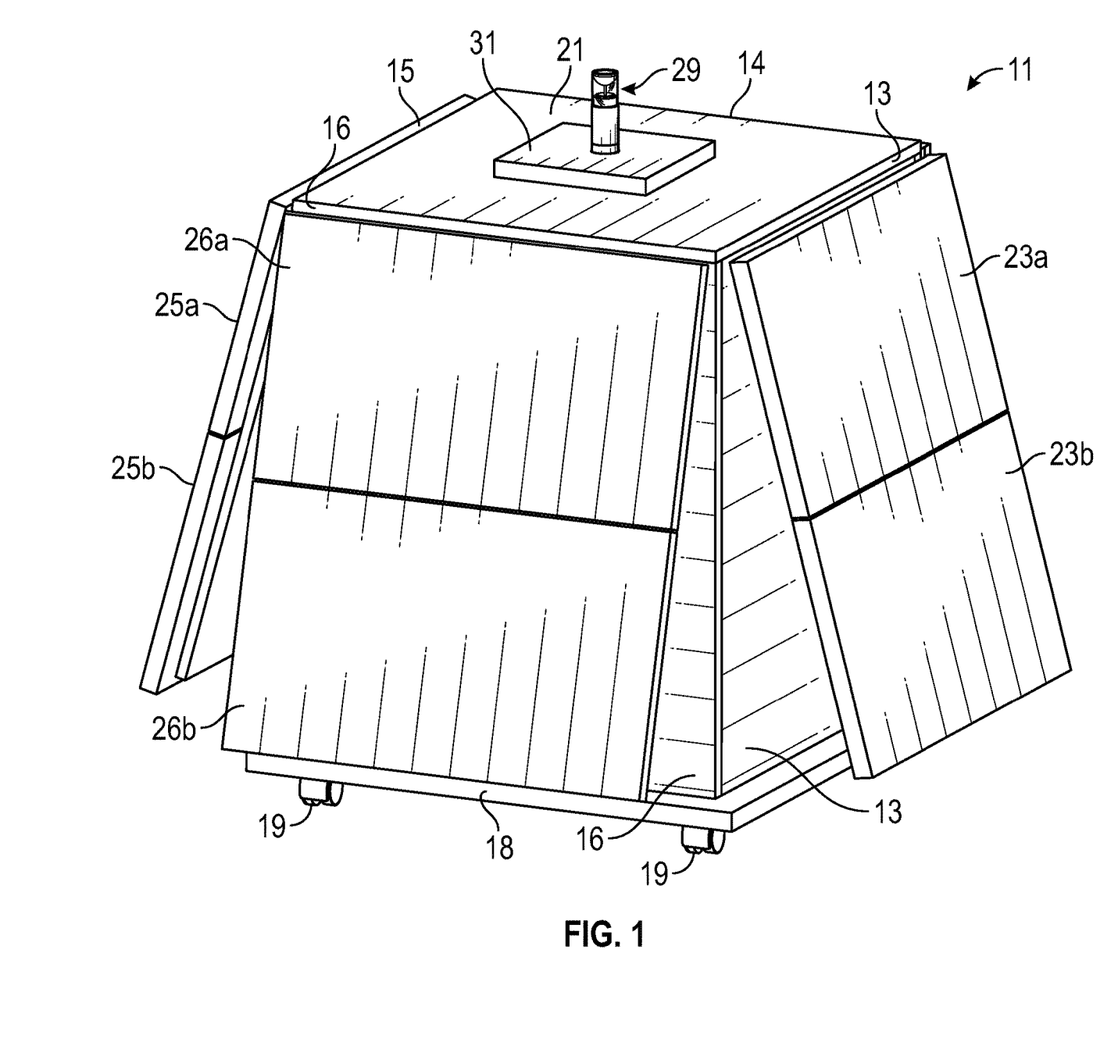
FIG. 1 is a perspective view of a first embodiment of an article of furniture in accord with the present invention.

With reference to FIG. 1, the invention is an article of furniture 11 for facilitating roundtable collaborative audio-video conferencing. In a first embodiment of the invention, a pedestal 11 has a frame 12 with a plurality of attached side wall panels 13, 14, 15, and 16 that correspond to respective viewer locations. A support base 18 at the bottom of the pedestal 11 can have a set of wheels 19 that allow the pedestal 11 to be more easily moved. The wheels 19 may be situated on independently vertically adjustable height casters that may be locked and fixed in place. This is especially beneficial if the surface on which the pedestal 11 rests is not perfectly level. Rubber feet that come down and engage the floor could be provided so that the pedestal sits firmly, then raised whenever it is desired to move the pedestal 11 to some other location via the wheels 19.

Typically, there would be one viewer location per side wall of the pedestal 11, but two viewer locations per side wall are also possible if the pedestal is wide enough. The pedestal 11 also has a horizontal upper surface 21 that is typically (but necessarily) planar. In this arrangement, a set of video monitors 23a-23b, 24a-24b, 25a-25b, 26a-26b (not all visible in this view) are supported by the respective side wall panels 13-16 of the pedestal 11. At least two monitors correspond to and are viewable at each of the multiple viewer locations. These could be arranged vertically as upper and lower monitors a and b for each viewer location (but horizontal side-by-side monitor arrangements are also possible).

The side wall panels 13-16 are hinged upon the top of the frame 12 to project outward from the pedestal 11 with a slightly upward tilt. In that case, where the pedestal 11 sits directly upon the floor with participants seated around that pedestal 11 with the video monitors 23a-23b, . . . 26a-26b situated below eye level, those monitors are then supported on the side wall panels 13-16 to also have a slight upward-directed display angle (e.g., 15°) so their screens are then more easily visible to the participants. One of the monitors at each viewer location is available to display a gallery view of other conference participants (including at least those at the other viewer locations around the pedestal, but also possibly other participants at remote locations). Another of the monitors at each viewer location is available to display shared content. (As an option, additional monitors might be provided, e.g., for multiple pages of shared content.) While it does not much matter which monitor serves as the one for the shared content and which for the gallery view, host or user settings could be provided to select a preference, provide for the upper monitor to serve as a default gallery view for closer-to-eye-level interaction, or even provide for the gallery view to switch to the lower monitor whenever shared content is being presented. In any case, the provision of two (or more) monitors per viewer location allows both shared content and the gallery view of other participants can be seen simultaneously by participants situated around the pedestal. (Any ability for simultaneous shared content and gallery views for remote participants will naturally depend on the specific technical facilities provided at those remote locations.)

Figure 2:
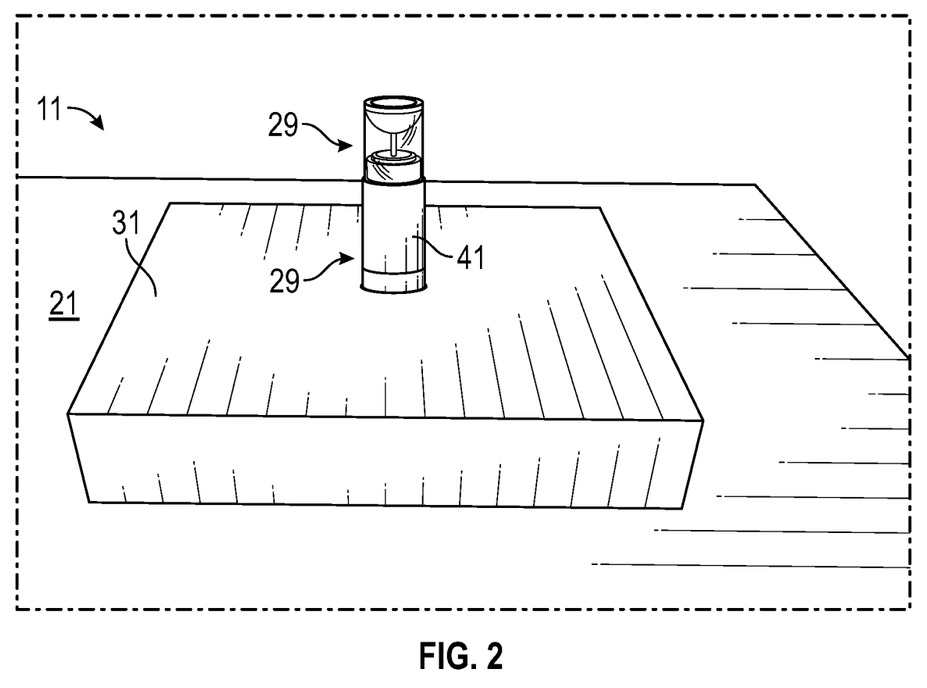
FIG. 2 is a perspective close-up view of an instrument pod on an upper surface of the article of furniture in FIG. 1.

An instrument pod 29 is provided on top of the horizontal upper surface 21 of the pedestal 11. (A close-up view of the instrument pod 29 is seen in FIG. 2.) The instrument pod 29 will include at least an array of microphones under a protective grill 31 and an omnidirectional (360°) camera 41 above that grill 31, such as a Katai BlueJay 360 camera. A wireless data communication unit might also be part of the instrument pod, if desired, as well as speakers for each viewer location, if not already provided on the video monitors. If desired, the camera height might be vertically adjustable, or a fixed height could be based on an average person. Ideally, the camera 41 will be at a height above floor so that the horizon line is just under the noses of seated conference participants.

Figure 3:
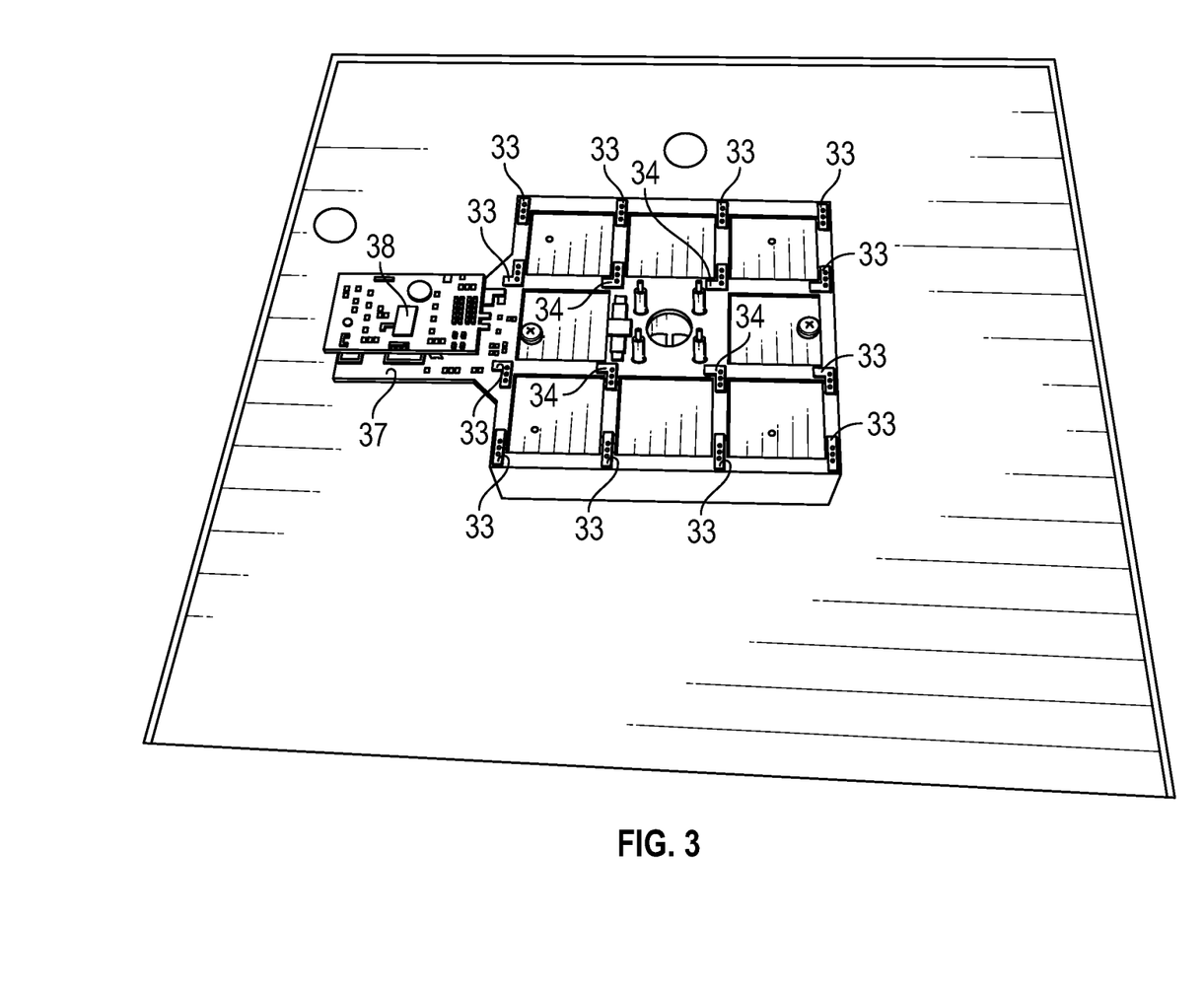
FIG. 3 is perspective view of a microphone array with associated electronics under a grill of the instrument pod in FIG. 2.

With reference to FIG. 3, the microphone array 33 and 34 and associated electronics 37 are provided under the grill 31. The version seen here is a 16-lobe microphone array that allows the system to track which of the conference participants present around the pedestal 11 is the primary speaker at any given time, based on the measured volume recorded by the different microphones 33 in the array. Specifically, the set of twelve perimeter microphones 33 may be dedicated to that speaker tracking function. Those microphones closest to the speaker will tend to register a larger volume than those furthest from the speaker. The electronics 37 include a digital signal processor (DSP) 39 using the microphone signal inputs to locate the specific direction of that current speaker. This will allow the 360° camera to quickly track to the speaker, such as by scanning mirrors associated with the camera. The four interior microphones 34 of the array are typically relegated to far-site audio sensing, which can be used by the DSP electronics 37 to perform sonic fencing (blocking out ambient noise from further away) as well as acoustic echo cancellation to eliminate any potential feedback.

Figure 4:
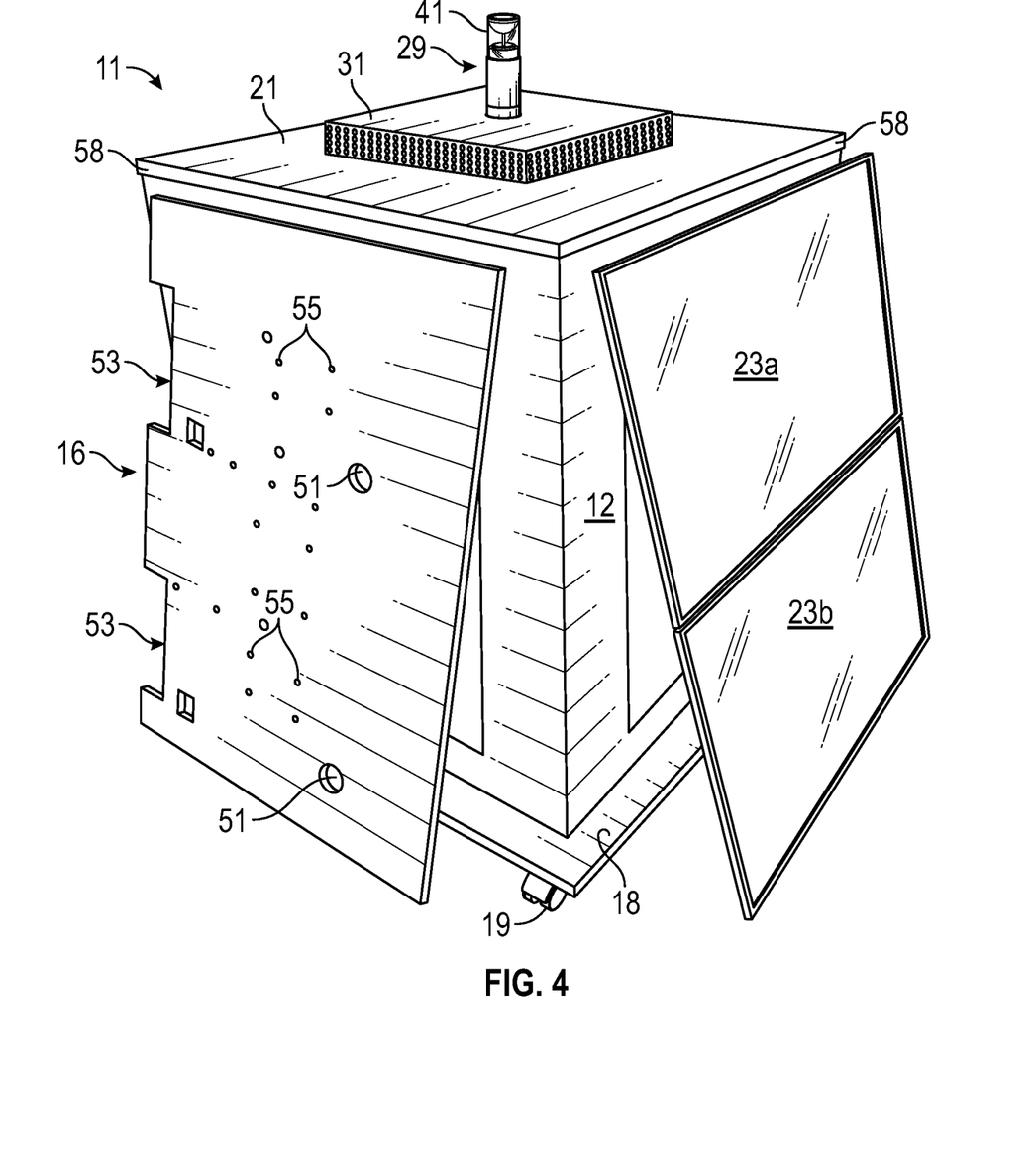
FIG. 4 is a perspective view of the article of furniture of FIG. 1 with video display monitors removed from one panel to show features of the panel.
Figure 5:
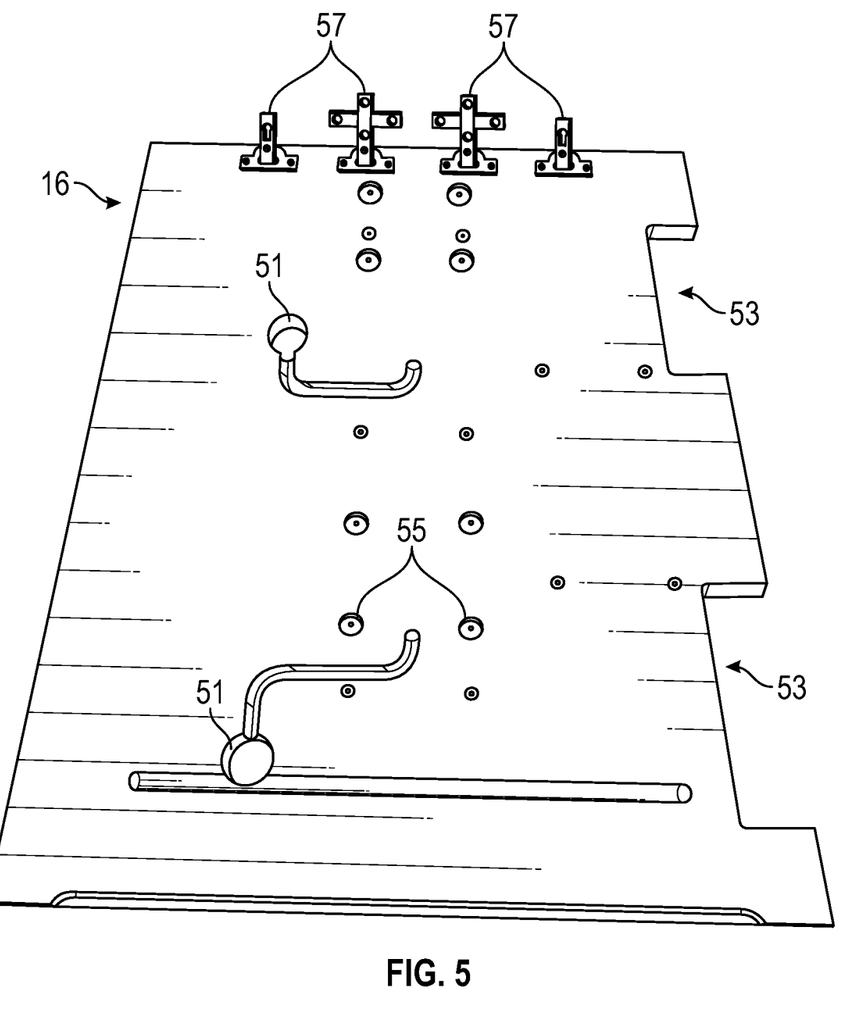
FIG. 5 is a perspective view of a reverse side of a panel as in FIG. 4 detached from the article of furniture.

With reference to FIG. 4, the pedestal 11 is typically a hollow frame structure 12 to which hinged side panels 13-16 are attached. Dual borderless displays 23a-23b . . . (typically of about 32-inch (81 cm) diagonal size) are mounted one above the other onto the respective side panels 13-16. These displays typically include embedded speakers for providing audio output. While two distinct displays, 23a and 23b, etc. are provided on each side panel, 13 etc., it might also be possible to use a single physical display, provided the display can operate in a split screen mode equivalent to two displays. One display (e.g., the upper displays 23a, etc.) is dedicated to showing a gallery view of the conference participants, while the other display (e.g., the lower displays 23b, etc.) is dedicated to displaying shared content to all the participants. This usual default arrangement could be reversed by the conference host, by a conference participant (for their own viewer location only), or under specified conditions to have the shared content (when present) closer to eye level. FIG. 4 shows one of the side panels 16 with the displays removed to illustrate several preferred features of the panels. FIG. 5 shows the reverse side of that same side panel 16 detached from the frame structure 12. Specifically, the panels can have a set of holes 51 and/or side gaps 53 for passage of one or more power and audio-video cables for the respective displays into the interior of the pedestal 11. Sets of four VESA screw holes 55 (and corresponding screws) are provided to securely mount the displays to the panels. Hinges 57 can be seen on the reverse side of panel 16 for attachment to a top beam 58 of the frame 12.

Figure 6:
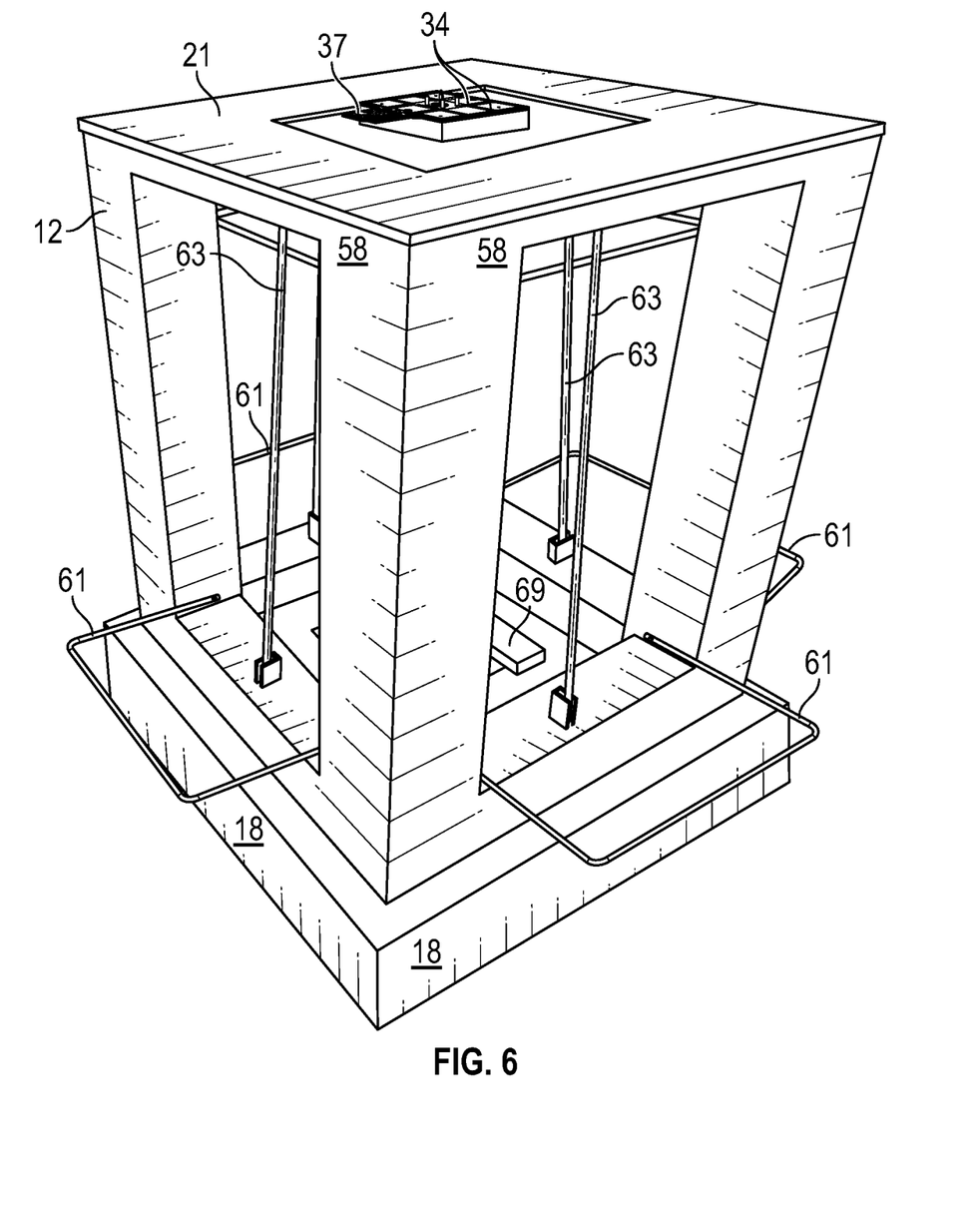
FIG. 6 is a perspective view of a frame of the article of furniture of FIG. 1 with panels and video display monitors removed.

As seen in FIG. 6, the frame structure 12 shown without the panels includes mechanical actuator bars 61 projecting outward from the bottom of the frame 12 for extending the panels into a tilt position. They can also be retracted back into a vertical position for ease in moving the pedestal 11. The bars 61 may be powered by small motors. Hydraulically actuated bars could also be employed, if desired. Hinged vertical interior bars 63 may also be provided to hold the panels up in a fully extended horizontal position as needed for servicing electronics 69 in the frame interior. Interior electronics 69 may include a desktop computer (e.g., a Dell™ Optiplex™ 790), as well as two sets of distribution amplifiers to drive the content shown by the displays and the audio speaker outputs. Additionally, when a conference is not in progress, it is possible that the distribution amplifiers work in concert for a merged view of paid advertising content on the various displays whenever the pedestal is located in a commercial or public space.

Figure 7:
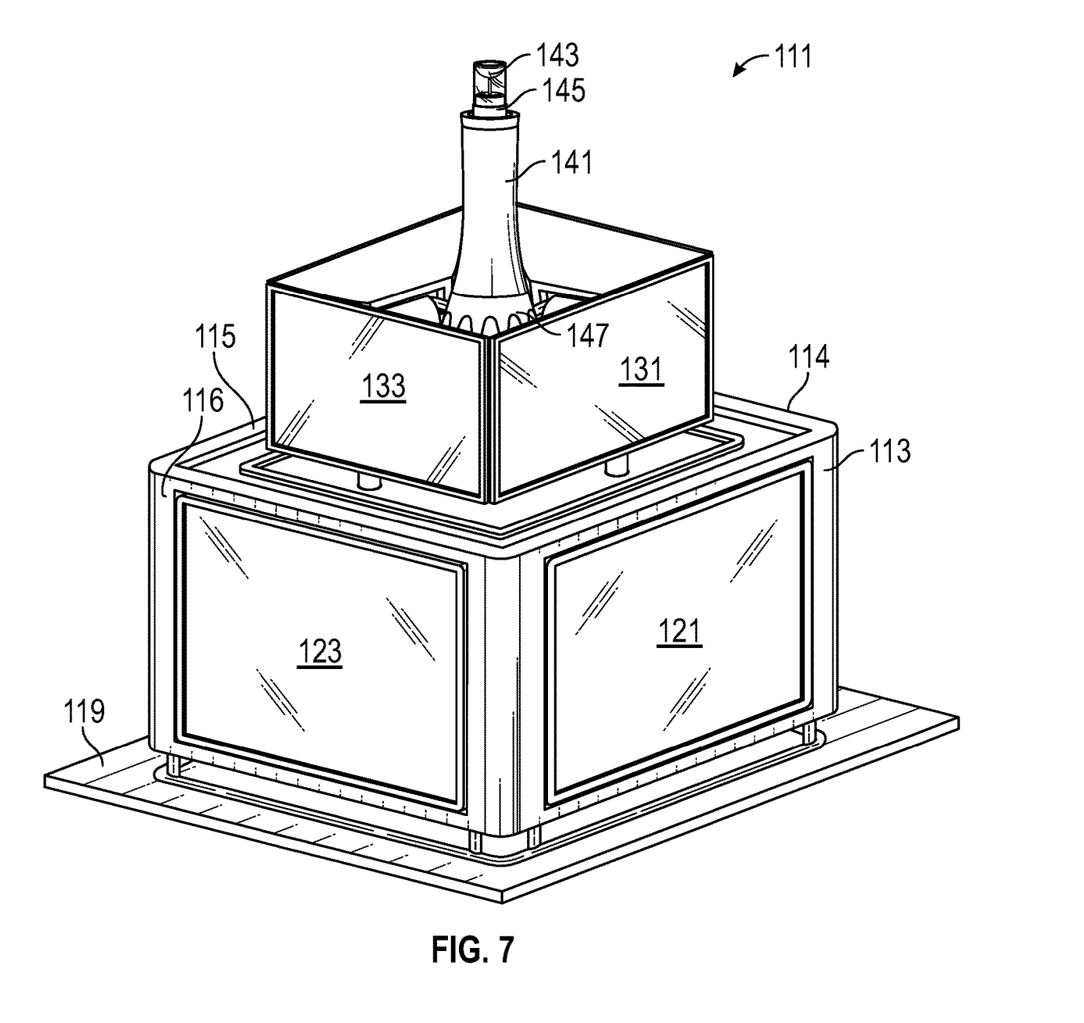
FIG. 7 is a perspective view of a second embodiment of an article of furniture in accord with the present invention.

With reference to FIG. 7, a second embodiment of the furniture 111 may have any number of (e.g., four) peripheral walled sides 113, 114, 115, 116 which extend vertically upward from slightly above a floor 119 to not more than about 30 inches from the floor, to form a box-like lower pedestal of the furniture 111. These lower walled sides 113-116 are exemplary but not limiting. Each of the sides and corresponding viewing location has multiple (usually two) display monitors in parallel alignment, with those two monitors viewable by a viewer associated with that side, perhaps seated a short distance from the monitors as if in a roundtable discussion. For example, walled side 113 has display monitors 121 and 131, while walled side 116 has display monitors 123 and 133. (The other sides are not visible in this view but would be similarly configured.) The monitors associated with each side or viewing location are preferably arranged as lower and upper monitors, stacked one over the over. Thus, for side 113, a lower monitor 121 is provided along with an upper monitor 131. The lower and upper monitors may be in vertical alignment directly over one another. The upper monitor could be inset, as seen here, with the lower monitor 121 mounted directly on a walled side 113 of the furniture article 111 and the upper monitor 131 atop a horizontal surface 135 of the furniture article and inset slightly back (i.e., closer to the center) from the lower monitor 121. Alternatively, the two monitors could be in a horizontal side-by-side arrangement, either mounted on or just above the walled side 113. Participating viewers are located around the furniture article in positions to see both monitors associated with one side of the furniture article. It is contemplated that one or both monitors at each viewer location could be individually tiltable for adjustable viewing by their viewers.

Near the center of the upper portion of the article of furniture 111, surrounded by the upper monitors 131, 133, etc. is a central tower 141 supported on a central horizontal surface 135 between the peripheral walled sides 113-116. This upper tower portion 141 provides for video input (one or more cameras), audio input and output (microphones and speakers), as well as data processing and transfer (signal transmission). In one embodiment, the tower 141 may have a camera pod 143, an audio pod 145, and an I/O signal distribution pod 147, in an integrated stacked arrangement. For example, the camera pod 143 is preferably atop the audio pod 145, which in turn is preferably atop the I/O signal distribution pod 147.

Figure 8:
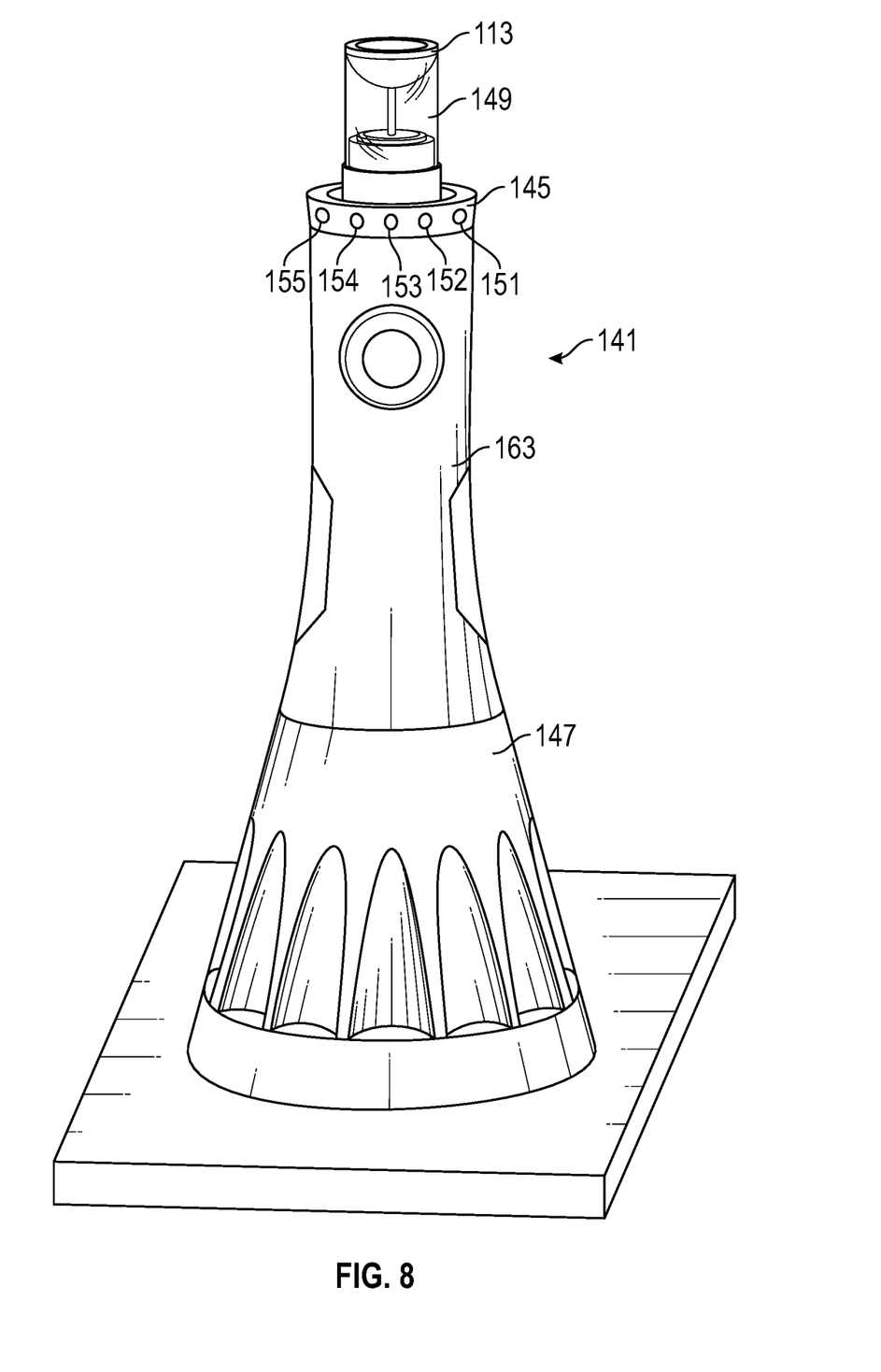
FIG. 8 is a close-up perspective view of an upper portion of FIG. 7 showing an embodiment of the central stack of camera, audio, and I/O signal distribution pods for the present invention.

In FIG. 8, a closeup of the central upper tower portion 141 of FIG. 7 is seen in isolation. The topmost portion of this central tower 141 is preferably occupied by the camera pod 143. Preferably, the camera pod 143 holds an omnidirectional (360°) camera, such as a Katai BlueJay 360 camera with a cylindrical construction. The camera has a 360° horizontal field of view generating a continuous input video signal stream.

In one mode of operation, this input video stream from the camera can be segmented and restitched into selectable video streams for each viewing location. A segmented view width can be selected to correspond to locations where viewers are expected. For viewers around a four-sided furniture article, the segmented view width for each viewing location would be not more than 90°. The same segmented width would be generally applied to all viewer positions with corresponding individual video stream segments being formed for each viewer location. This feature mimics multiple video cameras, each pointed toward a viewer location.

The multiple video segments are sequentially stitched together in streaming output video signals such that the stitching would not be discerned by or obvious to viewers. In the stitched video output stream, the other viewers around the furniture 111 are seen side-by-side or in a gallery view. The gallery view displays all other participating viewers, preferably with some form of highlighting of the viewer who is speaking. For example, the Katai BlueJay camera employs a Qualcomm processor and high-speed USB-C communication output of a video and audio signal with software stitching that mimics inputs from individual input streams (like that provided for Zoom clients). This segmenting and stitching processing of the camera video stream can be located in a signal processing pod 149 of the upper tower portion 141 between the camera pod 143 and the audio pod 145. In another mode of operation, the 360° camera could be directed (e.g., via scanning mirrors in the camera) toward the current speaker using microphones as an identifier of that speaker.

One of the monitors on each side displays a gallery view of viewer locations, while a second monitor on the same side can show shared content that has been wirelessly called by one of the viewers, for example by using a smart phone app. This shared content on the second monitor corresponds to a shared screen in Zoom, but now different screens are used for content and the gallery view of viewers so that a collaborative roundtable discussion occurs wherein viewers can still see each other without being minimized for content because that content is appearing on a separate monitor.

The audio pod 145 has directional microphones 151-155 etc. for audio input and one or more speakers 163 for audio output, all embedded in the central tower 141, typically combining at least one microphone plus a speaker for each viewer location. For example, in one possible embodiment the audio pod 145 is associated with the Katai BlueJay 360 camera and has an array of microphones 151-155 etc. that are directional for receiving audio input from each viewer location.

The sound received from the various microphones can be divided in a manner like the omnidirectional (360°) video signal so that sound segments are also associated with each viewer. The audio pod 145 would likewise have four full range speakers, with one speaker directed toward one of the sides of the furniture article 111. (Alternatively, the speakers could be in a separate speaker pod 163 located below the electronics pod 161.) Output from the speakers 163 must be coordinated with input to the microphones 151-155 to avoid audio feedback from the speakers into the microphones. In general audio output from speakers near an active microphone is suppressed to avoid feedback. Both video input from the camera pod 143 and audio input from the audio pod 145 may be sent to a smart device, such as a smart phone, tablet or computer that is serving as a Zoom client.

An electronics pod 161 for power supply and cooling functions may be in the upper tower portion 141 located just below the audio pod 145 (and above the speaker pod 163, if separate from the audio pod 145). Electric power would be received from a lower I/O signal distribution pod 147 that has connectors, not shown, that feed associated monitors with signals and power, as well as receiving power from an external supply, not shown.

As a result of this arrangement, with two monitors provided at each viewer location, video for each viewer will appear in a Zoom gallery view on one set of monitors (e.g., lower monitors 121, 123, etc.), while shared content called by one of the viewers can appear on the second set of monitors (e.g., upper monitors 131, 133, etc.) without losing the gallery view of conference participants.

What is claimed is:

1. An article of furniture for collaborative audio-video conferencing, comprising:
    a vertical central tower supporting a set of video monitors arranged around the central tower such that at least two monitors are viewable at each of a plurality of viewer locations; and
    an upper portion of the tower having a stack of at least a camera pod, an audio pod and an I/O signal distribution pod all mounted at a top of the tower, the camera pod having a 360° camera, the audio pod having directional microphones and speakers for each viewer location, and the I/O signal distribution pod providing wireless data communication,
    wherein one of the monitors at each viewer location displays a gallery view of conference participants at the other viewer locations and another of the monitors at each viewer location is available to display shared content.

2. The article of furniture as in claim 1, wherein the vertical central tower projects upward from a table.

3. The article of furniture as in claim 1, wherein the vertical central tower projects upward from a floor.

4. The article of furniture as in claim 1, wherein a lower portion of the tower is in the form of a pedestal with side walls supporting a first set of monitors at each viewer location and with a horizontal upper surface supporting the upper portion of the tower at its center and peripherally a second set of monitors at each viewer location.

5. The article of furniture as in claim 4, wherein the at least two monitors viewable at each viewer location comprise stacked lower and upper monitors.

6. The article of furniture as in claim 5, wherein the upper monitors are inset closer to the tower center than the lower monitors.

7. The article of furniture as in claim 1, wherein the at least two monitors viewable at each viewer location comprise parallel side-by-side monitors.

8. The article of furniture as in claim 1, wherein a field of view of the 360° camera is segmentable into multiple visual data streams, each visual data stream coinciding with one of the viewer locations.

9. The article of furniture as in claim 8, wherein the number of viewer locations is four and the field of view of the 360° camera is segmented into four up to 90°-wide visual data streams.

10. The article of furniture as in claim 8, wherein a monitor at each viewer location is connected to receive a stitched visual data stream composed from the multiple visual data streams for each of the other viewer locations around the central tower, the monitor thereby displaying conference participants at all other viewer locations in side-by-side relation.

11. The article of furniture as in claim 1, wherein the audio pod comprises multiple directional microphones with at least one microphone dedicated to each viewer location.

12. The article of furniture as in claim 11, wherein audio input received from the directional microphones is segmentable according to viewer location and a speaker for each viewer location outputs sound associated with audio input segments from the other viewer locations.

* * * * *